Patented Aug. 23, 1932

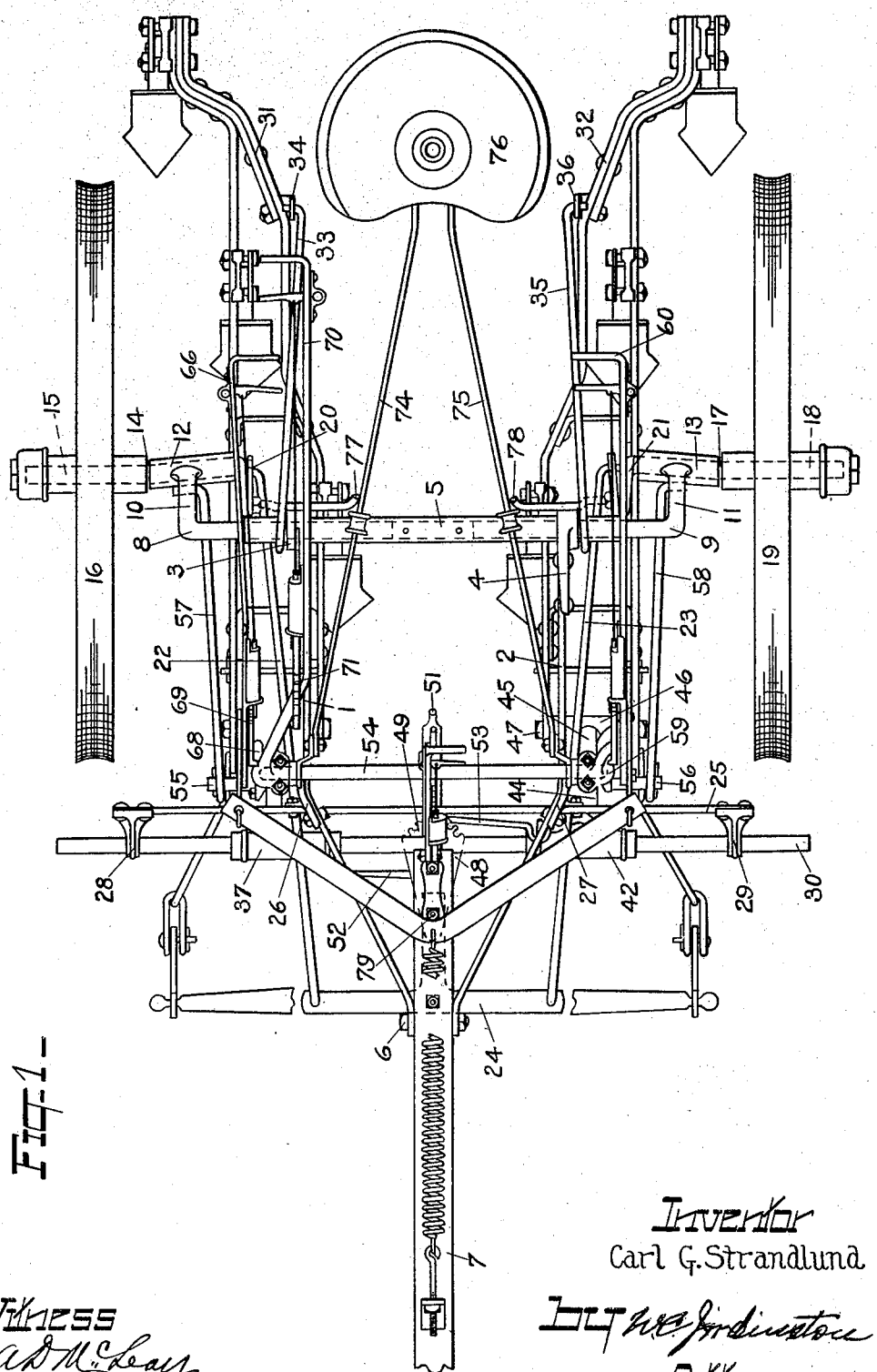

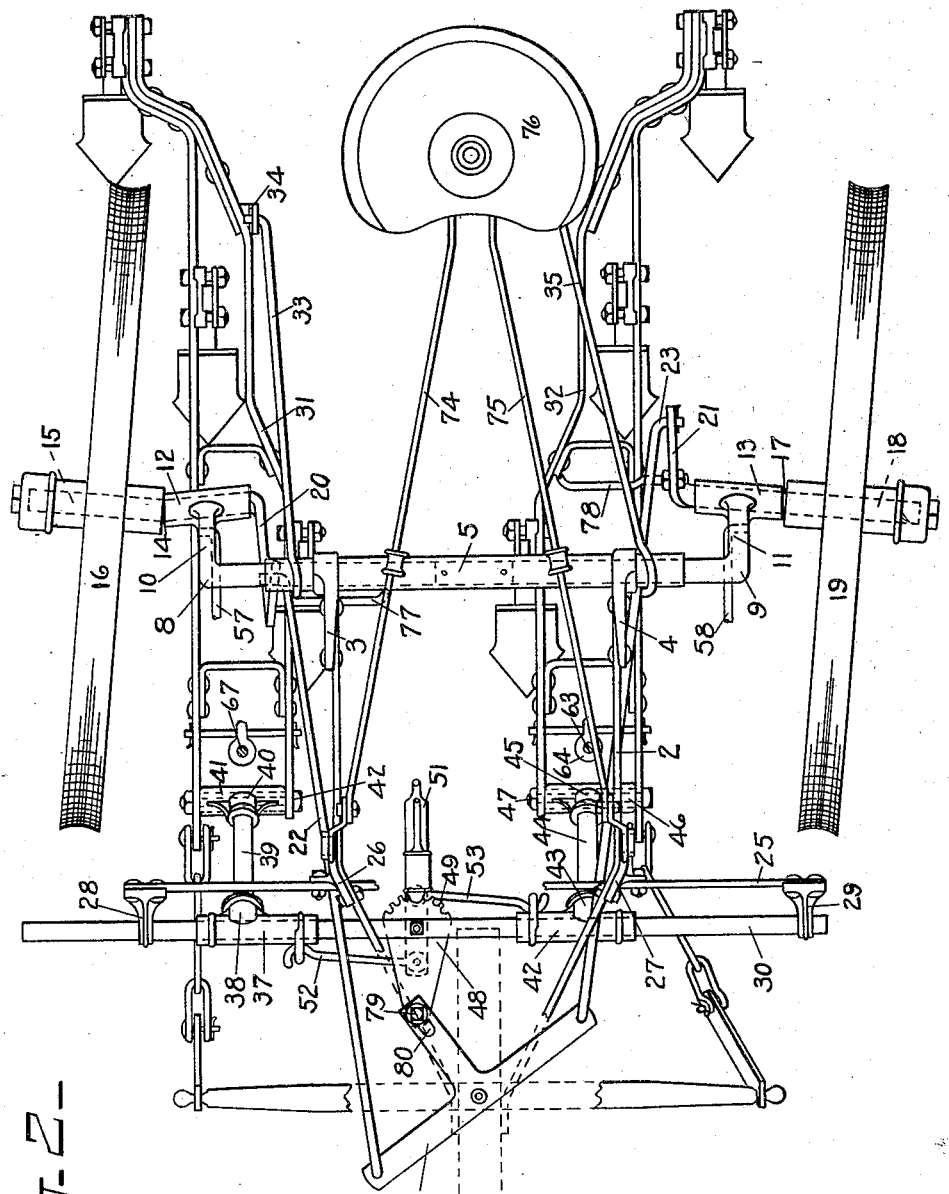

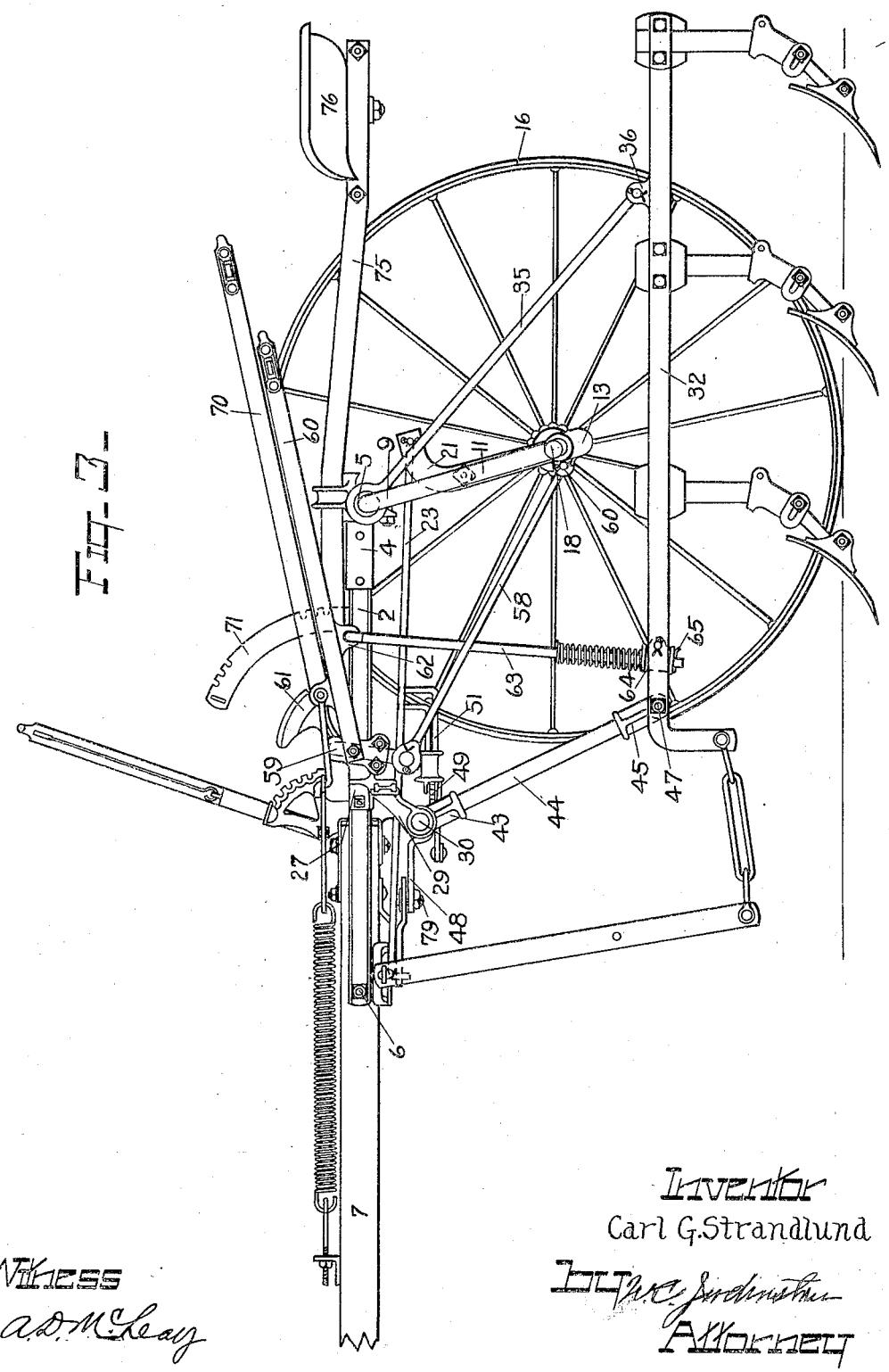

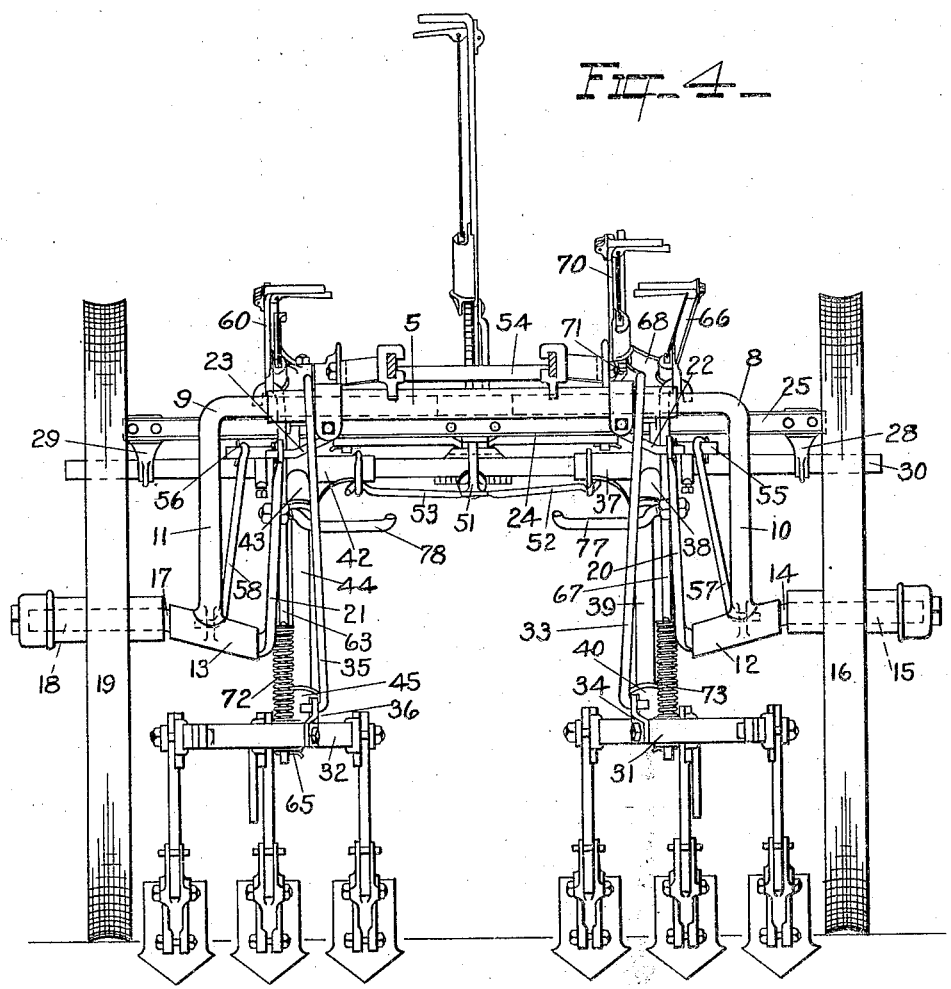

1,872,843

UNITED STATES PATENT OFFICE

CARL G. STRANDLUND, OF MOLINE, ILLINOIS, ASSIGNOR TO DEERE & COMPANY, OF MOLINE, ILLINOIS, A CORPORATION OF ILLINOIS

CULTIVATOR

Original application filed April 3, 1924, Serial No. 703,915. Divided and this application filed May 13, 1929. Serial No. 362,577. Renewed June 6, 1932.

My invention relates to cultivators and particularly to the control of the wheels and the cultivating rigs, and an object of my invention is to provide a simple, effective and novel means operative to steer the wheels and to correspondingly adjust the cultivating rigs. This application is a division of my application filed April 3rd, 1924, Serial No. 703,915.

Referring to the drawings in which similar numerals indicate identical parts—

Figure 1 is a plan view of a cultivator embodying my invention with the parts in position for advance of the cultivator in a straight line and the rigs in the ground.

Figure 2 is a similar view, in part, to Figure 1 but showing position of the parts when steering from the direct line of advance.

Figure 3 is a side elevation of Figure 1 with the cultivating devices in the ground, and the rear wheel removed.

Figure 4 is a rear view of Figure 3.

The frame of the cultivator comprises side bars 1 and 2 which are rigidly secured respectively to brackets 3 and 4 secured on a pipe or tube 5. The side bars 1 and 2 converge forwardly and between the forward ends is pivotally mounted, by a horizontal transverse bolt 6, a tongue or pole 7. Rockably journaled in the tube 5 are crank axles 8 and 9 having vertical portions 10 and 11 to the lower ends of which are secured, in any suitable manner, sleeves or bearings 12 and 13 inclined downwardly toward each other. A spindle 14 is rockably journaled in the sleeve 12 and has a horizontal portion 15 on which is mounted a supporting wheel 16; a similar spindle 17 is rockably journaled in the sleeve 13 and has a horizontal portion 18 on which is mounted a supporting wheel 19. An arm 20, preferably integral with the spindle 14, extends upwardly from the inner end of the spindle and substantially parallel with the vertical portion 10 of the crank axle 8, and a similar arm 21 is preferably integral with the spindle 17. The upper ends of the arms 20 and 21 are bent rearwardly, for a purpose hereafter explained, and to their rearward terminations rods 22 and 23 are respectively connected and extend forwardly to pivotal attachment to opposite ends of a horizontally rocking member 24 pivotally supported, intermediate its length, on the tongue 7.

A transverse bar 25 is rigidly supported on brackets 26 and 27 mounted on the side bars 1 and 2 respectively, and slidably supported in bearings 28 and 29, on the bar 25, is a shaft 30. Rigs of cultivating devices are designated by 31 and 32. The rig 31 is attached to the cultivator by a rod 33 having its lower end hooked in an eye in a casting 34 on the rig 31, and the upper end of the rod is provided with a loop fitting over the pipe 5; the rig 32 is attached in a similar manner by a rod 35 hooked in a casting 36 on the rig 32, and having a loop at its upper end fitting over the pipe 5. Forwardly the rig 31 is pivotally supported on the shaft 30 by a coupling consisting of a sleeve 37 having at a right angle thereto a socket 38 in which is rigidly held a post 39 which extends to and is secured in a socket 40 on a sleeve 41 attached to the rig 31 by a bolt 42. A similar coupling supports the rig 32 on the shaft 30 and comprises a sleeve 42 and a socket 43 in which is secured a post 44 having its lower end held in a socket 45 on a sleeve 46 mounted on a bolt 47 on the forward part of the rig 32.

Rigidly bolted centrally on the shaft 30 is a member 48, its rear end a curved rack 49, and its forward end terminating in a point to which is pivotally connected an arm 50 preferably integral with the rocking member 24, and central thereof. Pivoted intermediate its length, on the bolt which holds the member 48 on the shaft 30, is a lever 51 provided with the usual type of latch to engage with the notches in the rack 49; a link 52 is attached to the forward end of the lever 51 and to an eye on the sleeve 37, and a similar link 53 is attached to the lever 51, rearward of its pivot, and to an eye in the sleeve 42. By operation of the lever 51 the rigs, through the links 52 and 53 attached to the lever and to the sleeves 37 and 42, can be readily adjusted toward or from each other to accommodate the desired width of cultivation.

Mounted in bearings, formed preferably integral with the brackets 26 and 27, is a rock shaft 54 provided with crank ends 55 and 56. To the crank end 55 is connected a rod 57 extending rearwardly and attached to an eye on the sleeve 12; a similar rod 58 is connected to the crank end 56 and to an eye on the sleeve 13. A casting 59 is rigid on the crank end 56 of the rock shaft 54, and pivotally mounted thereon is a lever 60 provided with the usual type of latch to engage with a rack 61 on the rock shaft 54 and preferably integral with the casting 59. To an eye 62, on the lever 60, and intermediate its ends, is attached a rod 63 which extends downwardly through a sleeve 64 on the rig 32 and is secured therein by a cotter 65. By operation of the lever 60, the rig 32 is raised or lowered independently of the rig 31, which is also raised or lowered by operation of a lever 66 connected to the rig 31 by a rod 67 in a manner similar to the rod 63. The lever 66 is pivotally mounted on a casting 68, rigidly secured on the crank end 55 of the rock shaft 54, and has a latch to engage with a rack 69 on the casting 68. To raise or lower both rigs simultaneously, I employ a master lever 70 rigidly attached to the casting 68 and provided with a latch to engage with an arcuate rack 71 mounted on the frame bar 1, the lever 70 operating to rock the shaft 54, and as the levers 60 and 66, which are operable to raise the rigs independently, are pivotally supported on the crank ends of the rock shaft 54 and held in position by the latches on said levers engaging with the racks 61 and 69 respectively, it follows that both rigs will be raised or lowered simultaneously by operation of the lever 70 irrespective of the position they may be in by actuation of the levers 60 and 66. Coiled springs 72 and 73, mounted on the rods 63 and 67 respectively, exert an expansive force between cotters or pins on said rods and the sleeves 64 on the rigs to hold the rigs to their work when in operation.

Bars 74 and 75 are secured at their forward ends to the brackets 26 and 27 respectively, and converge rearwardly to support a seat 76 conveniently placed to accommodate leg reach of an operator to foot pieces 77 and 78, mounted respectively on the arms 20 and 21, and by pressure upon which the wheels are steered and the rigs correspondingly shifted.

As shown in Figure 1, the cultivator is supposed to be operating between straight rows, but if irregularities should be encountered in the rows, it will be necessary to steer the wheels and shift the rigs to avoid injury to the growing plants. In Figure 2 the wheels have been steered to the right and the rigs shifted in the same direction, and this action is accomplished by pressure of the foot of the operator on the foot piece 77, rocking the arm 20 forwardly and thereby imparting a limited rotary motion to the spindle 14; during this operation the crank axle 8 is stationary, consequently the horizontal portion 15 of the spindle, which is at an obtuse angle to the inclined portion, is swung to the right and steers the wheel 16 in that direction, the portions 15 and 18 retaining a constant horizontal position. The forward motion of the arm 20 forces the rod 22 forwardly and rocks the member 24, to which the rod 23 is connected, and thrusts the rod 23 rearwardly, rocking the arm 21 rearwardly and imparting a limited rotary movement to the spindle 17 whereby the horizontal portion 18 thereof is swung and the wheel 19 is steered simultaneously with the wheel 16 and in parallelism therewith. It is clearly apparent that if the arm 21 is rocked forwardly by force applied to the foot piece 78, the operation of the parts just described will be reversed and the wheels will be steered to the left.

The member 24 is pivotally supported on the tongue 7, and the arm 50 of the member 24 is pivotally connected to the forward point of the member 48 by a vertical bolt 79, in the member 48, which extends through a slot 80 in the arm 50. Now as the tongue 7 is not movable bodily to right or left, the swing of the member 24, by the connection of the arm 50 with the member 48, moves the member 48 in the direction in which the wheels are steered, so that the shaft 30, to which the member 48 is rigidly connected, and the rigs carried thereon are moved simultaneously with the steering of the wheels 16 and 19 and in the same direction, irrespective of the position of the rigs 31 and 32 relative to each other, the shaft 30 sliding readily in the bearings 28 and 29.

As before stated, the arms 20 and 21 are bent rearwardly at their upper ends and to the termination of the bent portions are respectively attached the rods 22 and 23, which extend forwardly to connection with the member 24. Now when the master lever 70 is operated, to raise the rigs 31 and 32 simultaneously, the rock shaft 54 is actuated to swing the crank ends thereof rearwardly and through the rods 57 and 58 the axles 8 and 9 are swung in the same direction; during this operation, the member 24 and the rods 22 and 23, connected to the arms 20 and 21, are stationary, but the rods 22 and 23 are attached to the arms 20 and 21 respectively, the point of attachment being in alignment, and also in substantially vertical alignment with the axes of the wheels 16 and 19 when the cultivator is in operation. Now if the arms 20 and 21 were straight, the point of attachment of the rods 22 and 23 thereto would be forward of the axes of the wheels, and would be stationary in the operation of raising the rigs by actuation of the master lever 70, consequently when the crank axles 8 and 9 are swung rearwardly, the movement of the sleeves 12 and 13 upon the angulated portions of the spindles 14 and 17 would cause an outward flare of the wheels 16 and 19, an objectionable action to be avoided if possible.

Standard cultivators are constructed with a gather to the wheels, the gather in this instance being too slight to be shown in the drawings; and to prevent a flare of the wheels 16 and 19 in the operation of the parts just described, I bend the upper portions of the arms 20 and 21 rearwardly, as shown, and to their extremity attach the rods 22 and 23 with the attachment in substantially vertical alignment with the axes of the wheels 16 and 19, when the cultivator is in operation, as before stated, for I find that by this construction the rearward swing of the axles 8 and 9 and the angulated sleeves 12 and 13 thereon, even to the limit of their movement, will swing the wheels 16 and 19 only a sufficient distance to bring them into parallel relation with each other, possibly removing the gather but preventing a flare.

What I claim is—

1. In an agricultural implement including a frame, the combination therewith of crank axles supported on the frame, each crank axle including a substantially vertically depending arm and a sleeve rigidly secured to the lower end thereof and disposed at an angle to the arm, spindles having bent portions rockably journaled in said sleeves, said spindles having horizontal portions on which ground wheels are mounted, means operable to rock said spindles in the sleeves in opposite directions to simultaneously steer the wheels angularly to the line of draft, earth working devices supported on the frame, and mechanism connecting the earth working devices and steering means operative to simultaneously move said devices and wheels in the same direction.

2. In an agricultural implement including a frame, the combination therewith of crank axles supported on the frame, each crank axle including a substantially vertically depending arm and a sleeve rigidly secured transversely to the lower portion of said arm at an angle thereto, spindles having bent portions rockably journaled in said sleeves, said spindles having horizontal portions on which ground wheels are mounted, earth working devices supported on the frame and laterally adjustable, a rocking member pivotally mounted on the implement and connected with said spindles and earth working devices, and means operable to rock one of said spindles forwardly and actuate said member to rock the other spindle rearwardly to steer the wheels to right or left and simultaneously and similarly move the earth working devices.

3. In an agricultural implement including a frame, crank axles supported on the frame, spindles having substantially horizontal portions on which ground wheels are mounted, the inner portions of said spindles being disposed at an acute angle to the horizontal and journaled in bearings on the axles, a vertical arm preferably integral with the inner end of each spindle, earth-working devices supported on the frame, a horizontally disposed rocking member pivoted on the implement and connected with said arms and devices, and means operable to rock one of said arms and spindles and to actuate said member to rock the other arm and spindle to steer the wheels to right or left and to simultaneously and similarly move the earth-working devices.

4. In an agricultural implement including a frame, crank axles supported on the frame, spindles having substantially horizontal portions on which ground wheels are mounted, the inner portions of said spindles inclined downwardly toward each other and journaled in bearings on the axles, a vertical arm preferably integral with each spindle, earth-working devices supported on the frame, a horizontally disposed rocking member pivoted on the implement and connected with said arms and devices, and means operable to rock one of said arms and spindles and to actuate said member to rock the other arm and spindle to steer the wheels to right or left and to simultaneously and similarly move the earth-working devices.

5. In an agricultural implement including a frame, the combination therewith of crank axles supported on the frame, gangs of earth-working devices supported on the frame for lateral adjustment, spindles comprising two sections disposed at an obtuse angle to each other, one section being rockably mounted on the crank axles so as to position the other section normally substantially horizontal, ground wheels on said other portions, a rocking member pivotally mounted on a vertical pivot on the implement and connected with said spindles and earth-working devices, and means operable to rock said spindles to steer the wheels and to simultaneously move the earth-working devices.

6. In an agricultural implement including a frame, the combination therewith of bearings supported on the frame and inclined downwardly toward each other, gangs of earth-working devices supported on the frame for lateral adjustment, spindles rockably supported in said bearings, ground wheels on the spindles, a horizontally rocking member pivotally mounted on the implement and connected with said spindles and earth-working devices, means to adjust said devices toward or from each other, and means operable to rock one of said spindles forwardly and actuate said member to rock the other spindle rearwardly to steer the wheels to right or left and to simultaneously and similarly move the earth-working devices irrespective of the adjustment thereof.

7. In an agricultural implement including a frame, the combination therewith of bearings supported on the frame and inclined at an acute angle to the horizontal, spindles rockably supported in said bearings, ground wheels on the spindles, a shaft located forwardly on the frame transversely thereof, bearings on the frame in which said shaft is longitudinally movable, gangs of earth-working devices supported on said shaft and movable laterally therewith, a horizontally rocking member pivotally mounted on the implement and connected with said spindles, and means operable to rock one of said spindles forwardly and actuate said member to rock the other spindle rearwardly to steer the wheels to right or left and simultaneously move said shaft and gangs in the direction in which the wheels are steered.

8. In an agricultural implement including a frame, the combination therewith of bearings supported on the frame and inclined at an acute angle to the horizontal, spindles rockably supported in said bearings, ground wheels on the spindles, a shaft located forwardly on the frame transversely thereof, bearings on the frame in which said shaft is longitudinally movable, gangs of earth-working devices supported on the shaft and movable laterally therewith, means on the shaft to adjust said gangs toward or from each other, a horizontally rocking member pivotally mounted on the implement and connected with said spindles and gang adjusting means, means to rock one of said spindles forwardly and actuate said member to rock the other spindle rearwardly to steer the wheels to right or left and simultaneously move said shaft and gangs in the direction in which the wheels are steered irrespective of the adjustment of the gangs relative to each other.

9. In an agricultural implement including a frame, the combination therewith of crank axles supported on the frame, bearings on the lower end of said crank axles and inclined at an acute angle to the horizontal, spindles rockably supported in said bearings, ground wheels on the spindles, a shaft located forwardly on the frame transversely thereof, bearings on the frame in which said shaft is longitudinally movable, gangs of earth-working devices supported on said shaft and movable laterally therewith, means mounted on said shaft and connected with said gangs and operable to adjust them toward or from each other, a horizontally rocking member pivotally mounted on the implement and connected with said spindles and gang adjusting means, and means operable to rock one of said spindles forwardly and actuate said member to rock the other spindle rearwardly to steer the wheels to right or left and simultaneously move said gangs in the direction in which the implement is steered irrespective of the adjustment of said gangs.

10. In an agricultural implement including a frame, the combination therewith of bearings supported on the frame and inclined downwardly toward each other, spindles rockably supported in said bearings, ground wheels on the spindles, a shaft located forwardly on the frame transversely thereof, bearings on the frame in which said shaft is supported and longitudinally movable, gangs of earth-working devices slidably mounted on said shaft, a member rigidly secured on the shaft and extending forwardly therefrom, a lever pivoted intermediate its ends on said shaft and connected with said gangs and operable to adjust them toward or from each other, a rack on the rear end of said member, a detent on said lever to engage with the rack and hold the gangs in adjusted position relative to each other, a horizontally rocking member pivotally mounted on the frame and pivotally connected to said first mentioned member, means to connect said rocking member with the spindles, and means to rock one of said spindles forwardly and actuate the rocking member to rock the other spindle rearwardly to steer the wheels to right or left and simultaneously move said shaft and gangs in the direction in which the wheels are steered irrespective of the adjustment of the gangs by operation of said lever.

11. In an agricultural implement including a frame, the combination therewith of bearings supported on the frame and inclined toward each other at an obtuse angle, gangs of earth-working devices adjustably supported on the frame, spindles journaled in said bearings having outwardly extending horizontal portions, supporting wheels mounted on said portions, and mechanism mounted on the frame and connected with said spindles and operable to rotate said spindles in opposite directions and to simultaneously adjust said earth-working devices.

12. In an agricultural implement including a frame, the combination therewith of bearings supported on the frame and inclined toward each other at an obtuse angle, gangs of earth-working devices adjustably supported on the frame, spindles journaled in said bearings having outwardly extending horizontal portions, steering arms mounted on the inclined ends of said spindles, and mechanism mounted on the frame and connected with said arms and operable to rotate said spindles to actuate said steering means and to simultaneously adjust said earth-working devices.

CARL G. STRANDLUND.